(12) United States Patent
Higuchi et al.

(10) Patent No.: US 9,389,752 B2
(45) Date of Patent: Jul. 12, 2016

(54) MENU SCREEN DISPLAY METHOD AND MENU SCREEN DISPLAY DEVICE

(75) Inventors: Masaki Higuchi, Tokyo (JP); Shigeru Enomoto, Kanagawa (JP); Yasuhiro Yamanaka, Chiba (JP); Shuji Hiramatsu, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 1063 days.

(21) Appl. No.: 13/000,071

(22) PCT Filed: Apr. 17, 2009

(86) PCT No.: PCT/JP2009/001785
§ 371 (c)(1),
(2), (4) Date: Feb. 3, 2011

(87) PCT Pub. No.: WO2010/001514
PCT Pub. Date: Jan. 7, 2010

(65) Prior Publication Data
US 2011/0145764 A1    Jun. 16, 2011

(30) Foreign Application Priority Data
Jun. 30, 2008    (JP) ................................. 2008-170191

(51) Int. Cl.
*G06F 3/048* (2013.01)
*G06F 3/0482* (2013.01)
*G06F 3/0481* (2013.01)

(52) U.S. Cl.
CPC .......... *G06F 3/0482* (2013.01); *G06F 3/04817* (2013.01); *A63F 2300/308* (2013.01); *A63F 2300/636* (2013.01); *G06F 2203/04804* (2013.01)

(58) Field of Classification Search
CPC ..................................................... G06F 3/0482
USPC .......................................................... 715/835
See application file for complete search history.

(56) References Cited

U.S. PATENT DOCUMENTS 6,600,496 B1 * 7/2003 Wagner et al. ................. 715/716
6,686,938 B1 * 2/2004 Jobs et al. ...................... 715/835
(Continued)

FOREIGN PATENT DOCUMENTS

CN          1795674 A       6/2006
CN          101006417 A     7/2007
(Continued)

OTHER PUBLICATIONS

Playstation 3 User's Guide, (hereinafter "Playstation"), available at http://web.archive.org/web/20080206035421/http://manuals.playstation.net/document/en/ps3/current/game/start.html, Feb. 6, 2008.*
(Continued)

*Primary Examiner* — Matthew Ell
(74) *Attorney, Agent, or Firm* — Matthew B. Dernier, Esq.

(57) ABSTRACT

An instruction acquisition unit acquires a menu display instruction in a menu screen display device. When the menu display instruction is acquired while a game program is running, a menu-screen generating unit displays, by a function of a system, on a television set a second system menu screen in which an end icon for terminating the running game program is inserted in between a plurality of content icons that are arranged in a line in a first system menu screen and displayed. The instruction acquisition unit acquires the selection of the displayed end icon from a user. When the selection of the end icon is acquired, a menu screen constituting unit terminates the running game program and displays on the television set a first system menu screen by deleting the end icon from the second system menu screen.

16 Claims, 12 Drawing Sheets

(56) References Cited

U.S. PATENT DOCUMENTS

| | | | |
|---|---|---|---|
| 7,340,686 B2* | 3/2008 | Matthews et al. | 715/779 |
| 8,023,044 B2 | 9/2011 | Yasuda | |
| 2001/0049301 A1* | 12/2001 | Masuda et al. | 463/33 |
| 2003/0051228 A1* | 3/2003 | Martinez et al. | 717/109 |
| 2006/0007129 A1* | 1/2006 | Pletikosa | 345/156 |
| 2006/0287106 A1* | 12/2006 | Jensen | 463/42 |
| 2007/0101364 A1 | 5/2007 | Morita | |
| 2008/0055490 A1 | 3/2008 | Yasuda | |
| 2009/0027495 A1* | 1/2009 | Oskin et al. | 348/143 |
| 2009/0125842 A1 | 5/2009 | Nakayama | |
| 2013/0014059 A1 | 1/2013 | Nakayama | |

FOREIGN PATENT DOCUMENTS

| | | |
|---|---|---|
| EP | 0717344 A1 | 6/1996 |
| GB | 2350991 A | 12/2000 |
| JP | 2000-148348 A | 5/2000 |
| JP | 2004038306 A | 2/2004 |
| JP | 2004356774 A | 12/2004 |
| JP | 2006163650 A | 6/2006 |
| JP | 2007151180 A | 6/2007 |
| JP | 2007300565 A | 11/2007 |

OTHER PUBLICATIONS

Sams Teach Yourself Mac OS X Leopard All in One (hereinafter "Leopard"), Ness et al., Dec. 12, 2007, pp. 43-47.*
"Sams Teach Yourself Mac OS X Leopard All in One" (hereinafter "Leopard"), Ness et al., Dec. 12, 2007, pp. 16, 355, 360, 377.*
Miser, "Special Edition Using Mac OS X Leopard," published Dec. 27, 2007, p. 557.*
JP Office Action for corresponding JP Patent Application No. 2008-170191, dated Sep. 27, 2011.
International Search Report for corresponding application PCT/JP2009/001785, dated Jul. 21, 2009.
International Preliminary Report on Patentability for corresponding application PCT/JP2009/001785, Feb. 8, 2011.
European search report for corresponding EP application No. 09773092.3, dated Apr. 4, 2014.
Office Action for corresponding CN application No. 200980123286.X, dated Dec. 9, 2014.

* cited by examiner

MENU SCREEN DISPLAY METHOD AND MENU SCREEN DISPLAY DEVICE

TECHNICAL FIELD

The present invention relates to techniques of displaying menu screens and particularly to techniques of displaying menu screens including techniques of displaying content icons for starting application programs.

BACKGROUND ART

Predetermined application programs can be executed in game devices, PCs (personal computers), and the like. In order to start any one of these programs, menu screens can often be displayed as a function of a system.

DISCLOSURE OF THE INVENTION

While executing any one of the programs, a user may wish to execute another program in parallel or to start another program in place of the running program. However, input of instructions with respect to running programs (e.g., an instruction for terminating the execution) and input in such menu screens are usually entered in a clearly separate manner in terms of the user interface. Therefore, when executing programs in parallel or switching programs, a user is required to use a different user interface so as to carry out these operations. On the other hand, there is a strong need for the development of unified user interfaces that allow for various operations to be performed in order to present a novel user-friendly impression to a user.

SUMMARY OF THE INVENTION

In this background, a purpose of the present invention is to provide a user with a unified user interface regarding a menu screen.

Means for Solving the Problem

A menu screen display device according to one embodiment of the present invention comprises: acquiring a menu display instruction from a user requesting a menu screen of a system to be displayed while an application program is running; and displaying, by a function of the system, a second menu screen in which, in addition to a content icon included in a first menu screen of the system that is displayed when the application program is not running, an instruction icon for entering an instruction to the running application program is displayed while being mixed with the content icon, when the menu display instruction is acquired.

The term "system" represents a system configured by basic hardware and basic software, for example, a CPU or OS (operating system) of an information processor and also represents a configuration that enables the information processor to perform certain functions regardless of the presence of an application program. This embodiment allows for a running program to be directly terminated in a menu screen, thus providing a user interface that is unified in terms of the input of instructions for terminating the execution of the program and input in the menu screens.

Optional combinations of the aforementioned constituting elements and implementations of the invention in the form of methods, apparatuses, systems, computer programs, recording media storing computer programs, and data structures may also be practiced as additional modes of the present invention.

The present invention allows for a user to be provided with a unified user interface regarding a menu screen.

DETAILED DESCRIPTION OF THE PREFERRED EMBODIMENTS

Figure 1:
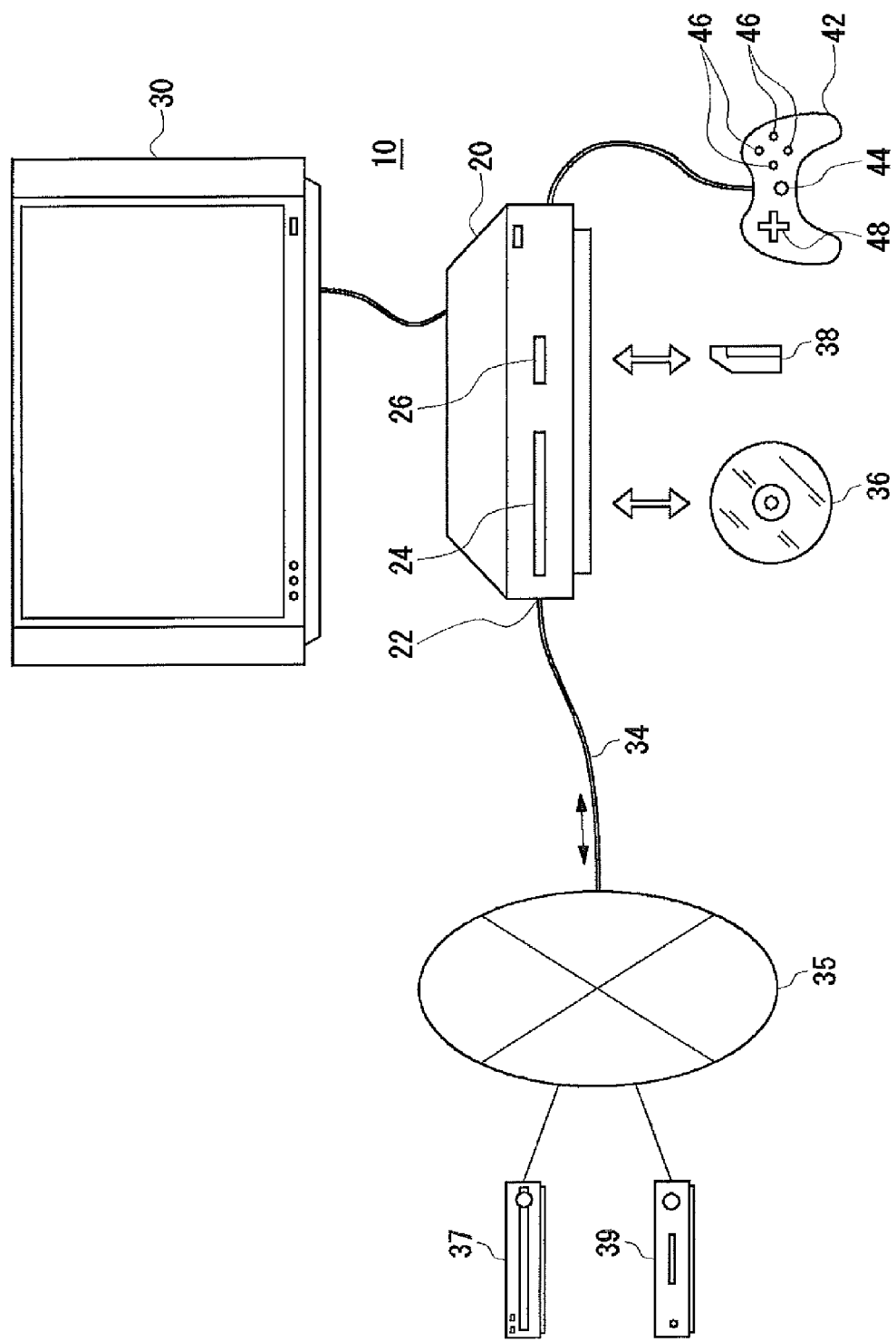
FIG. 1 is a diagram illustrating the basic configuration of a multimedia reproduction system.

FIG. 1 illustrates the basic configuration of a multimedia reproduction system. A multimedia reproduction system 10 is configured by a multimedia player 20 that functions as an information processor, a television set 30, a controller 42, a LAN (Local Area Network) 35, and the like, having the multimedia player 20 in the center.

The television set 30 functions as a display and displays an image that is based on a received television broadcast signal. The television set 30 also has a function of displaying or outputting video pictures and sounds, which are output from the multimedia player 20, by being connected to the multimedia player 20.

The controller 42 is connected to the multimedia player 20 in a wired or wireless manner. The controller 42 has a home button 44, operation buttons 46, and a directional button 48. The home button 44 is used as a button that is pressed by a user mainly when terminating a running application program or when displaying a menu screen. The operation buttons 46 are used to select an icon included in a menu screen, which is displayed on the television set 30, and to enter input for returning back to a pre-selection condition and also used as operation buttons for application programs such as games. The directional button 48 is used to scroll through a menu screen and to change an icon to be highlighted and also used as an operation button for application programs such as games. When any of the home button 44, the operation buttons 46, and the directional button 48 is pressed, the controller 42 outputs a signal indicating the press of the button to the multimedia player 20.

The multimedia player 20 has a network control unit 22, and connecting a network cable 34 to the network control unit 22 allows for the multimedia player 20 to be connected to the LAN 35. Therefore, for example, when external devices 37 and 39 are connected to the LAN 35, the multimedia player 20 can be connected to the external devices 37 and 39 via the LAN 35. As described above, the multimedia player 20 and the external devices 37 and 39 can transmit and receive content to/from one another. The multimedia player 20 is not limited to be connected to a LAN and can be connected to other networks such as Internet.

The multimedia player 20 has a network control unit 22, a disk reader 24, and a memory-card slot 26. The network control unit 22 has a network connection terminal (not shown), and mounting the network cable, which is connected to the LAN 35, to the network connection terminal connects the external devices 37 and 39 and the multimedia player 20 via the LAN 35. The network control unit 22 detects the external devices that are connected to the LAN 35 and that transmit and receive data to/from the detected external devices. The network control unit 22 receives, for example, content, which is stored in the external devices 37 and 39, via the LAN 35.

The disk reader 24 loads data stored in an optical disk 36. The disk reader 24 may have a function of a writing apparatus for writing data on the optical disk 36. The disk reader 24 may load data, such as movies and music albums, from the optical disk 36. The memory-card slot 26 is provided so that a memory card 38 can be inserted and ejected. The memory-card slot 26 loads data, which is stored in the loaded memory card 38, and write data on the memory card 38. The memory-card slot 26 may load data such as captured images and captured video from the memory card 38.

The multimedia player 20 displays, on the television set 30, a menu screen for instructing content reproduction. On the menu screen, an item of content stored in the multimedia player 20 and an item of content stored in the external devices 37 and 39 are displayed, and each item of content can be reproduced by the multimedia player 20 based on a user's instruction.

Figure 2:
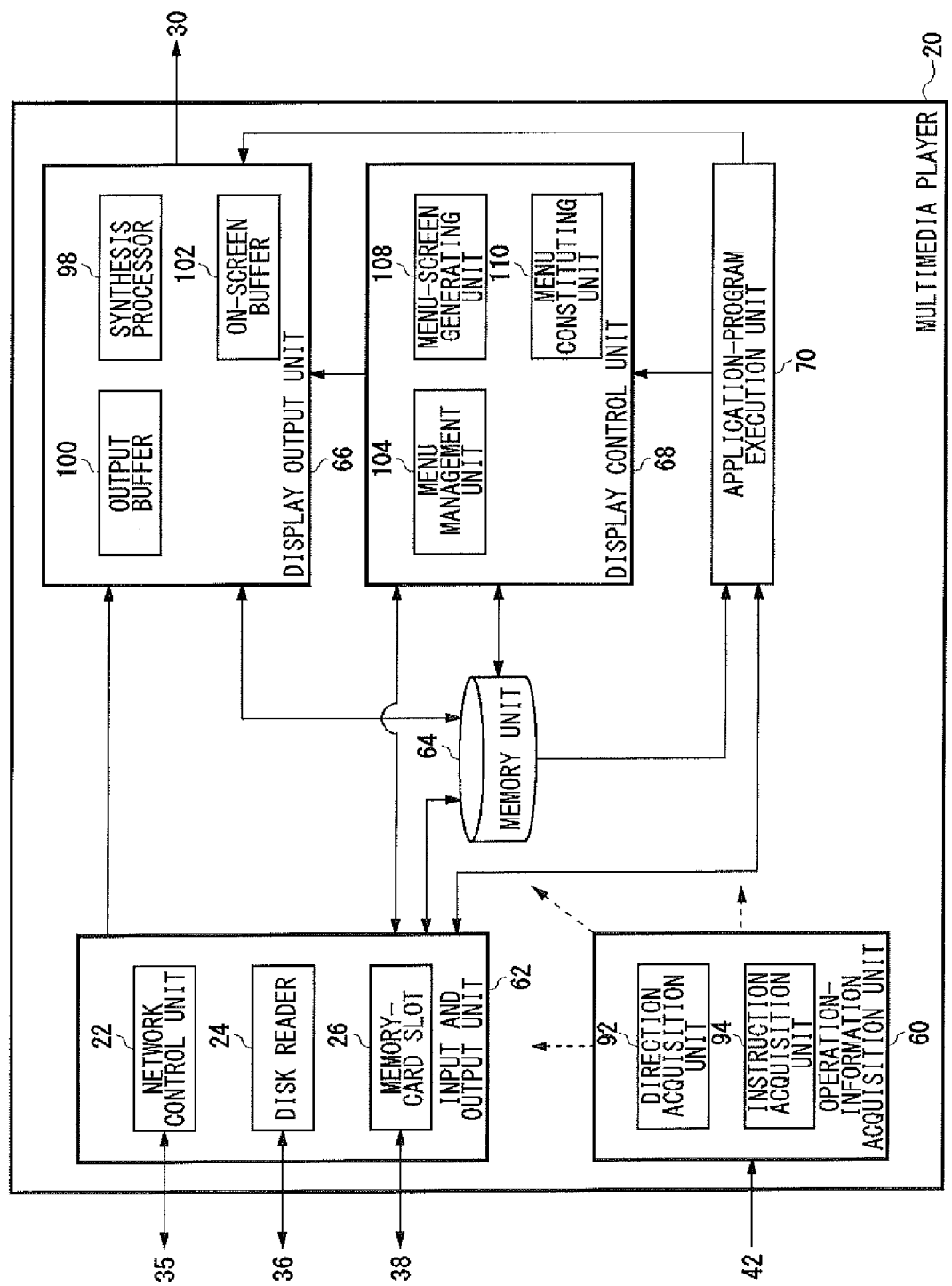
FIG. 2 is a functional block diagram illustrating the configuration of a multimedia player.

FIG. 2 is a functional block diagram illustrating the configuration of a multimedia player. The multimedia player 20 includes an operation-information acquisition unit 60, an input and output unit 62, a memory unit 64, a display output unit 66, a display control unit 68, and an application-program execution unit 70. The multimedia player 20 can be implemented in hardware by the configurations of CPU's, hard disks, RAM, ROM, plot circuits, or the like, and in software by a program that fulfills functions such as a data input function, a data storing function, an image processing function, and a drawing function. FIG. 2 depicts functional blocks implemented by the cooperation of hardware and software. Thus, there are many ways of accomplishing these functional blocks in various forms in accordance with the components of the combination of hardware and software.

The operation-information acquisition unit 60 has a direction acquisition unit 92 and an instruction acquisition unit 94. Through the operation of the controller 42 by a user, the direction acquisition unit 92 acquires an instruction regarding any one of four directions up, down, left, and right. The instruction acquisition unit 94 acquires an instruction, for example, to reproduce the content, to stop reproducing the content, or to call up a menu screen through the user's operation of the controller 42.

The input and output unit 62 has a network control unit 22, a disk reader 24, and a memory-card slot 26. The network control unit 22 processes the input of the content stored in the external device and the output of various data via the network cable 34. The disk reader 24 controls the input of the data stored in the optical disk 36 and the writing of data to the optical disk 36. The memory-card slot 26 inputs and outputs data with the memory card 38.

The network control unit 22 detects an external device that is connected to the LAN 35. The network control unit 22, the disk reader 24, and the memory-card slot 26 acquire information such as the item names of the content stored in the external devices 37 and 39, the optical disk 36, and the memory card 38, the data of icons that correspond to the items of content, and the data sizes, respectively, and store the information in the memory unit 64. The data acquired by the respective units of the input and output unit 62 is transmitted to the display output unit 66, the display control unit 68, the memory unit 64, and the application-program execution unit 70.

The memory unit 64 includes a nonvolatile memory device, for example, a hard disk. The network control unit 22, the disk reader 24, and the memory-card slot 26 acquire information such as the item names of the content stored in the external devices 37 and 39, the optical disk 36, and the memory card 38, the data on the icons that correspond to the items of content, and their data sizes and store the information in the memory unit 64.

The memory unit 64 stores the data of a plurality of function icons that represent the types of regeneration functions, reproducible content such as moving images, still images, and music, various types of programs such as an application program executed by the application-program execution unit 70, and the data of folder icons that represent the display unit of content. Content icons that represent the items of contents stored in the external devices 37 and 39, the optical disk 36, and the memory card 38 are acquired by the network control unit 22, the disk reader 24, and the memory-card slot 26 from the external devices 37 and 39, the optical disk 36, and the memory card 38, respectively, and stored in the memory unit 64. These function icons, content icons, and folder icons are used as constituent elements that constitute a menu screen and are displayed in a user-selectable manner on the menu screen. The function icons, content icons, and folder icons may be uncompressed images such as bitmap images or compressed images such as JPEG images.

The display output unit 66 includes: an output buffer 100 that temporarily stores reproduction data, which is to be output to the television set 30, before the reproduction data is output; an on-screen buffer 102 that temporarily stores image data for on-screen display, which is to be output to the television set 30, before the image data is output; and a synthesis processor 98 that synthesizes reproduction data and image data.

The on-screen buffer 102 stores, for example, the menu screen produced by the display control unit 68 and the image data of the background screen both as the image data for on-screen display. The synthesis processor 98 synthesizes the reproduction data stored in the output buffer 100 and the image data of the menu screen and the background screen stored in the on-screen buffer 102, then converts synthesized data into an analog signal, and outputs the analog signal to the television set 30.

The display control unit 68 includes: a menu management unit 104 that manages the type of reproduction function and the content corresponding to the reproduction function as a menu item; a menu-screen generating unit 108 that processes the movement of an icon in a menu screen and generates the menu screen; and a menu constituting unit 110 that configures a menu.

In addition to storing the item of the content stored in the memory unit 64 and the item of the content to be input via the input and output unit 62, the menu management unit 104 stores the reproduction function and the content that are being selected at the moment. The "reproduction function" includes, for example, a still-image reproduction function, a music reproduction function, a moving-image reproduction function, a broadcast display function, and a game execution function, and it further includes various setting functions and a network-apparatus selection function. The menu management unit 104 associates the item of content with the type of a content reproduction function and with a plurality of folder icons.

The menu-screen generating unit 108 generates a menu screen configured with an array of a plurality of function icons that are lined up in a horizontal direction and an array of a plurality of content icons or folder icons that are lined up in a vertical direction. These two arrays cross each other near the center of the screen and form a cross-shaped array. The menu-screen generating unit 108 displays the function icons and either the content icons or folder icons that are highlighted at or near the intersection of the cross-shaped array so that they can be distinguished from other icons in their appearance. Furthermore, with respect to each of the multiple folder icons, the menu-screen generating unit 108 acquires, from the memory unit 64, one of content icons representing related content as a folder attachment image. The menu-screen generating unit 108 then displays the folder attachment image and the folder icon so that the folder attachment image is included in the folder icon superimposed thereon.

The menu-screen generating unit 108 performs processing as to the scroll-displaying of arrays of function icons, folder icons, and content icons, and the highlight-displaying of a function icon, a folder icon, or a content icon to which attention is given. A highlighted icon is provided in a different format from other icons. For example, the highlighted icon is displayed in a color different from that of other icons with the change thereto or is displayed in an enlarged manner with the change thereto.

The menu constituting unit 110 adds or deletes a content icon included in a menu so as to configure a system menu. More specifically, the menu constituting unit 110 associates each of a plurality of content icons to each of the function icons and determines the order of arranging the content icons in a content icon array 123. When constituting a second system menu, the menu constituting unit 110 arranges an end icon and an icon for display during reproduction, which will be described hereinafter, so that the end icon and the icon for display during reproduction are inserted between a plurality of content icons, among the content icons included in the first system menu, that are arranged in a line in the content icon array 123. The icon for display during reproduction also functions as an operation-panel display icon for displaying an operation panel, which allows a user to enter an instruction regarding the reproduction state of music content. The menu-screen generating unit 108 arranges the end icon and the icon for display during reproduction in a predetermined area and highlight them so that they are visually noticeable by the user in a given case.

By executing a reproduction application program stored in the memory unit 64, the application-program execution unit 70 decodes the coded data of content such as a moving image, a still image, or music that is loaded by the disk reader 24 from the optical disk 36, content that is loaded by the memory-card slot 26 from the memory card 38, or content that is loaded from the memory unit 64 so as to reproduce the content. The application-program execution unit 70 transmits the image or the sound reproduced in such a manner to the display output unit 66. Based on a user's instruction acquired by the operation-information acquisition unit 60, the application-program execution unit 70 controls switching of a reproduction function, start and stop of the reproduction of the content, and loading of the data from the memory unit 64, based on the function of the reproduction application program that is running.

By executing a browser program stored in the memory unit 64, the application-program execution unit 70 transmits and receives data such as content via the LAN 35. By executing a chat program stored in the memory unit 64, the application-program execution unit 70 transmits and receives data that indicates the content of the chat via the LAN 35. By executing a game program loaded by the disk reader from the optical disk 36 or a game program loaded from the memory unit 64, the application-program execution unit 70 transmits the video pictures and the sounds of the game to the display output unit 66.

Figure 3:
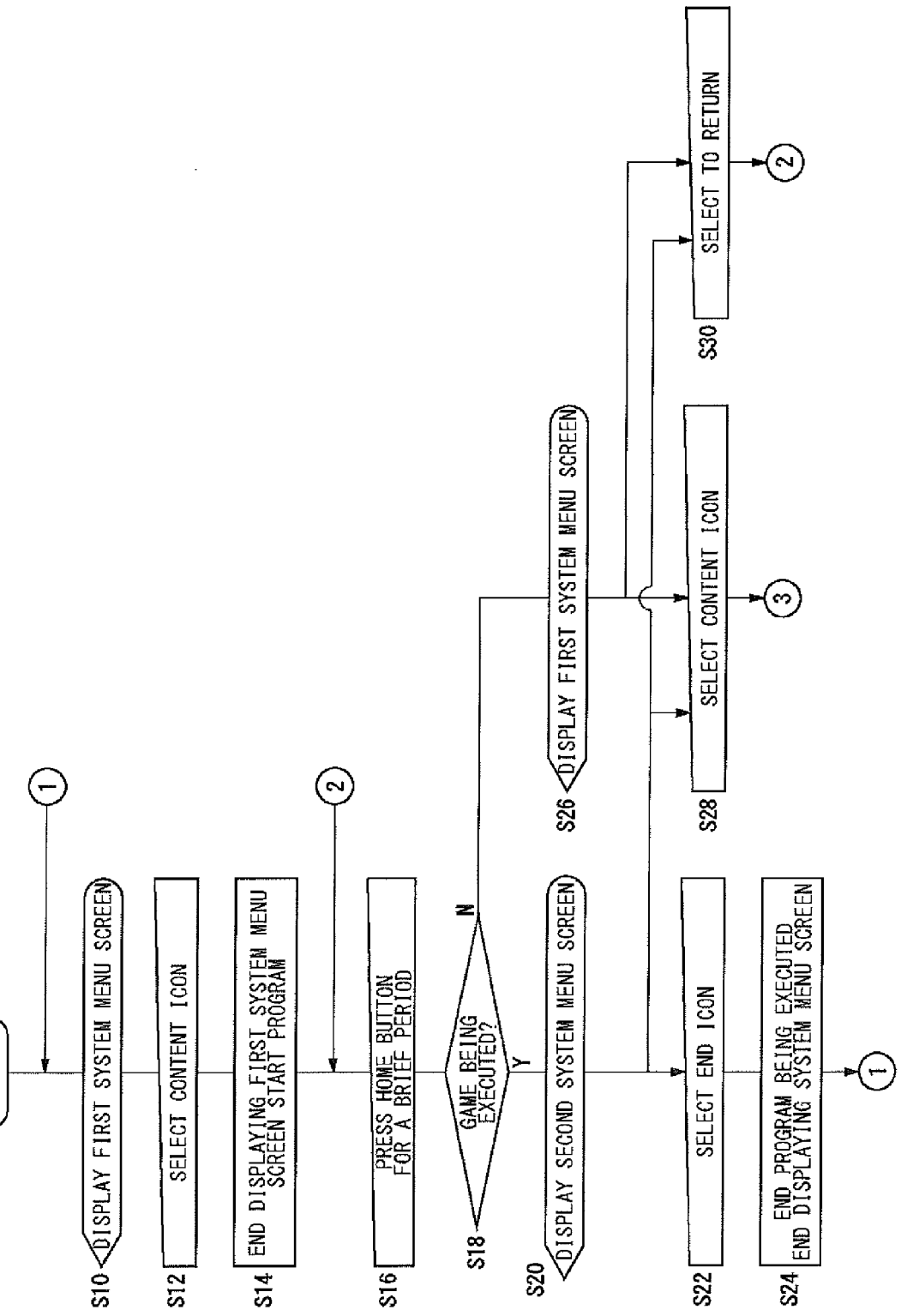
FIG. 3 is a diagram illustrating an example of an operation procedure performed by a user of the multimedia player according to the present embodiment.

FIG. 3 is a diagram illustrating an example of an operation procedure performed by a user of a multimedia player 20 according to the present embodiment. Turing on the power of the multimedia player 20 starts the process of the flowchart.

When the power of the multimedia player 20 is turned on, the menu constituting unit 110 configures the first system menu, and the display output unit 66 outputs the first system menu screen, which displays a part of the configured first system menu to the television set 30 so as to display the first system menu screen (S10).

Figure 5:
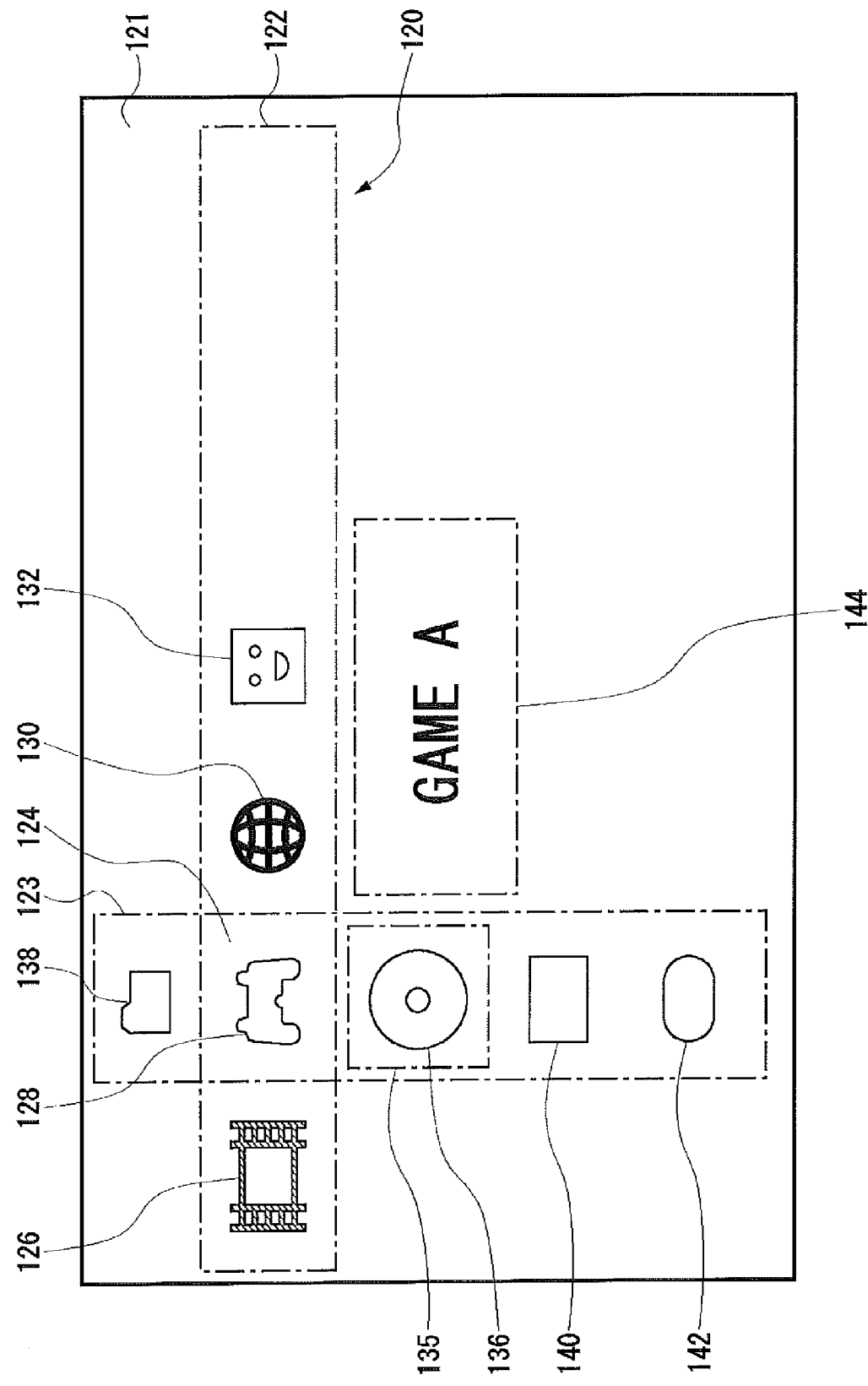
FIG. 5 is a diagram illustrating an example of the first system menu screen that is displayed in step S10 in FIG. 3.

FIG. 5 is a diagram illustrating an example of a first system menu screen 120 that is displayed in the step S10 in FIG. 3. The first system menu screen 120 is used as a menu screen of the system and is a menu screen that is displayed by a function of the system. In the first system menu screen 120, a two-dimensional array in which the function icon array 122 orthogonally intersects the content icon array 123 is displayed.

The function icon array 122 is configured by function icons such as a moving image icon 126, a game icon 128, a network icon 130, or a friend icon 132, which represent the types of reproduction functions of the multimedia player 20, that are arranged in a line in a horizontal direction. The content icon array 123 is configured by content icons aligned in a line in a vertical direction, which indicate the respective content.

The "content icon" includes an icon for starting an application program such as a game program and an icon that indicates content such as a moving image, a still image, or music. With regard to the content such as a moving image, a still image, or music, a reproduction application program, such as a player or a slide show, is also started by the user's selection. Therefore, a content icon is also used as a start icon to start an application program. The first system menu screen 120 is presented as an on-screen display superimposed upon the front face of a content image.

A function icon arranged in the area where the function icon array 122 and the content icon array 123 intersect (intersection area 124) is colored differently from the other function icons and enlarged as illustrated. The intersection area 124 is located at a predetermined position in the first system menu screen 120. According to the user's instruction via the operation-information acquisition unit 60, the entirety of the function icon array 122 moves left or right so as to change the color and size of the function icon arranged in the intersection area 124. Positioning a function icon in the intersection area 124 is hereinafter referred to as selecting a function icon. A user can select a desired function icon merely by specifying the lateral direction of left or right.

The menu-screen generating unit 108 moves function icons left or right by scrolling the whole area of the function icon array 122 left or right. While the function icons are moved left or right, the menu-screen generating unit 108 displays each of them with the same color and size but changes the color and size of only the function icon arranged in the intersection area 124. To change the color, the menu-screen generating unit 108 may change attributes of the function icon such as the brightness, chroma, and hue, or may display the icon in a flashing manner. In such way, since a function icon arranged in the intersection area 124 is displayed in a different display format from the other function icons, a user can select a medium easily.

When there is no function icon in the intersection area 124 while the function icons are moving left or right, the menu-screen generating unit 108 does not display the content icon array 123. When any of the function icons are arranged in the intersection area 124, the menu-screen generating unit 108 may display, in an extended manner, the content icon array 123 in a manner such that the array extends upward and downward from the intersection area 124, or may fade the already-extended content icon array 123 into the first system menu screen 120. By fading the extended content icon array 123 into the screen, blurred images of the icons in the array are gradually made clear. In other words, the intensity of a filter applied to the icons is gradually reduced with time. Also, if the folder icons and folder attachment images are the objects configured by mapping textures onto polygons, the Z values of the polygons may be manipulated. By gradually increasing or decreasing the Z values of the polygons from the initial values, the extended content icon array 123 will be displayed in such a manner as to move downward or upward from the front or back of the screen vertical axis to the level where the menu screen is defined. Also, by gradually increasing the α values of the textures from the initial values, the extended content icon array 123 may be displayed in a manner such that the transparent array gradually becomes opaque. Further, the extended content icon array 123 may be displayed in such a manner as to move from the right or left edge of the screen to the intersection area 124. The display methods stated above may be used in combination.

By merely scrolling the function icons left or right with the intersection area 124 as the target point, the user can recognize content adaptable to the reproduction function. Contrarily, if an instruction as to the lateral direction is provided while the content icon array 123 is displayed, the menu-screen generating unit 108 displays the content icon array 123 such that the extended content icon array 123 is withdrawn toward the intersection area 124 or fade the extended content icon array 123 out from the first system menu screen 120. A means used for a fade-out is the same as that for a fade-in.

An attention area 135 located near the center of the first system menu screen 120 is an area in which the user's target icon is displayed. The attention area 135 is placed near the lower part of the intersection area 124. When a function icon that is arranged in the intersection area 124 is changed by scrolling a function icon in a lateral direction, the menu-screen generating unit 108 highlights the function icon arranged in the intersection area 124 and places, in the content icon array 123, the content icon that belongs to the function icon arranged in the intersection area 124. The menu-screen generating unit 108 highlights the content icon placed in the attention area 135 among the content icons placed in the content icon array 123.

The content icon is not selected only by being placed in the attention area 135. The content icon is selected only by the operation of a predetermined button among the operation buttons 46 while the content icon is placed in the attention area 135. Thus, such a condition of the content icon being placed in the attention area 135 is referred to as the content icon being temporarily selected. A description display area 144 is provided near the right side of the attention area 135. The description of the content displayed in the attention area 135 is displayed in the description display area 144.

When the operation-information acquisition unit 60 acquires the user's instruction as to the longitudinal direction of up or down, content icons and folder icons are moved upward or downward according to the instruction. The menu-screen generating unit 108 moves the content icons and the folder icons upward or downward by scrolling up or down the entire area of the content icon array 123.

The menu-screen generating unit 108 generates a system menu screen in which a content icon or a folder icon, among the content icons placed in the content icon array 123, that is placed in an area other than the attention area 135 is a normal size and in which a content icon or a folder icon that is placed in the attention area 135 is enlarged beyond the normal size as an attention icon. The menu-screen generating unit 108 may also change attributes of the attention icon such as the brightness, chroma, and hue, or may display the icon flashing.

The menu-screen generating unit 108 displays the function icon array 122 slightly above the vertical center of the first system menu screen 120, and displays the content icon array 123 slightly to the left of the horizontal center of the first system menu screen 120.

The moving image icon 126 represents a moving image reproduction function and should be selected when a moving image is reproduced. A moving image to be reproduced is a recorded image captured by a digital video camera or an image loaded from the optical disk 36 or an external device, which are encoded in a specific compression format. A folder attachment image that is displayed in an extended manner when the moving image icon 126 is located in the intersection area 124 is, for example, a thumbnail of a jacket image distributed with a moving image by a vendor or a thumbnail of a given frame of a moving image. The thumbnail may be a moving image. When there is no image suitable for the folder attachment image, the moving image icon 126 may be used instead. As the folder information, view information (such as genre, artist, capture month and capture year of a moving image, alphabetical order, and all images) and the number of moving images are displayed. Also, information including the title of the moving image, the recording date, and the reproduction time is displayed as the content information.

The game icon 128 represents a game execution function and should be selected when a game program is executed. An object to be executed is a game program stored in the memory unit 64 or a game program loaded from the optical disk 36. A folder attachment image that is displayed in an extended manner when the game icon 128 is located in the intersection area 124 is, for example, a thumbnail of a jacket image distributed with a game program by a vendor, an icon representing a game program, a thumbnail of a given frame of a moving image provided in a game, or a thumbnail of an image of a game character. The thumbnail may be a moving image. When there is no image suitable for the folder attachment image, the game icon 128 may be used instead. As the folder information, view information (such as genre, alphabetical order, and all programs) and the number of application programs are displayed. Also, information including the title of the game program and the date on which the program was installed is displayed as content information.

The network icon 130 represents a network execution function and should be selected when an application program for connecting to a network is executed. An object to be executed is a browser program stored in the memory unit 64. The friend icon 132 represents a chat function on a network and should be selected when an application program for chatting via a network is executed. An object to be executed is a chat program stored in the memory unit 64.

In addition to these icons, although not shown in FIG. 5, function icons also include a photo icon and a music icon. The photo icon represents a still image reproduction function and should be selected when a still image is reproduced. The images to be reproduced are still images mainly captured by a digital camera, and the images are, for example, loaded from the memory card 38. A folder attachment image that is displayed in an extended manner when the photo icon is located in the intersection area 124 is, for example, a thumbnail of a still image. When there is no image suitable for the folder attachment image, the photo icon may be used instead. As the folder information, view information (such as capture month and capture year of a still image, album, alphabetical order, and all photos) and the number of still images are displayed. Also, capture information including the capture date and the file size is displayed as content information.

The music icon represents a music reproduction function and should be selected when music data is reproduced. Music data to be reproduced is generated, for example, by encoding data loaded from the optical disk 36 in a specific compression format. A folder attachment image that is displayed in an extended manner when the music icon is located in the intersection area 124 is, for example, a thumbnail of a jacket image of a song distributed with music data by a vendor or a thumbnail of a visual effect image generated from part of music data through a specific process. When there is no image suitable for the folder attachment image, the music icon may be used instead. As the folder information, view information (such as genre, album, artist, recording year, alphabetical order, and all music) and the number of pieces of music data are displayed. Also, information including the song title, the album title, and the playing time is displayed as the content information.

The first system menu is configured by the above-mentioned function icons and content icons. A part of the function icons included in the first system menu configured as described above is displayed in such a manner that all the function icons can be displayed by scrolling. Among the content icons included in the first system menu, the content icons that belong to the function icons located in the content icon array 123 are displayed while preventing the content icons that belong to other function icons from being displayed.

FIG. 3 is referred back. When the first system menu screen 120 is displayed and when any of the content icons is selected by a user (S12), the instruction acquisition unit 94 acquires an instruction for selecting the content icon from the controller 42, and the application-program execution unit 70 starts the application program that corresponds to the selected content icon (S14).

Figure 6:
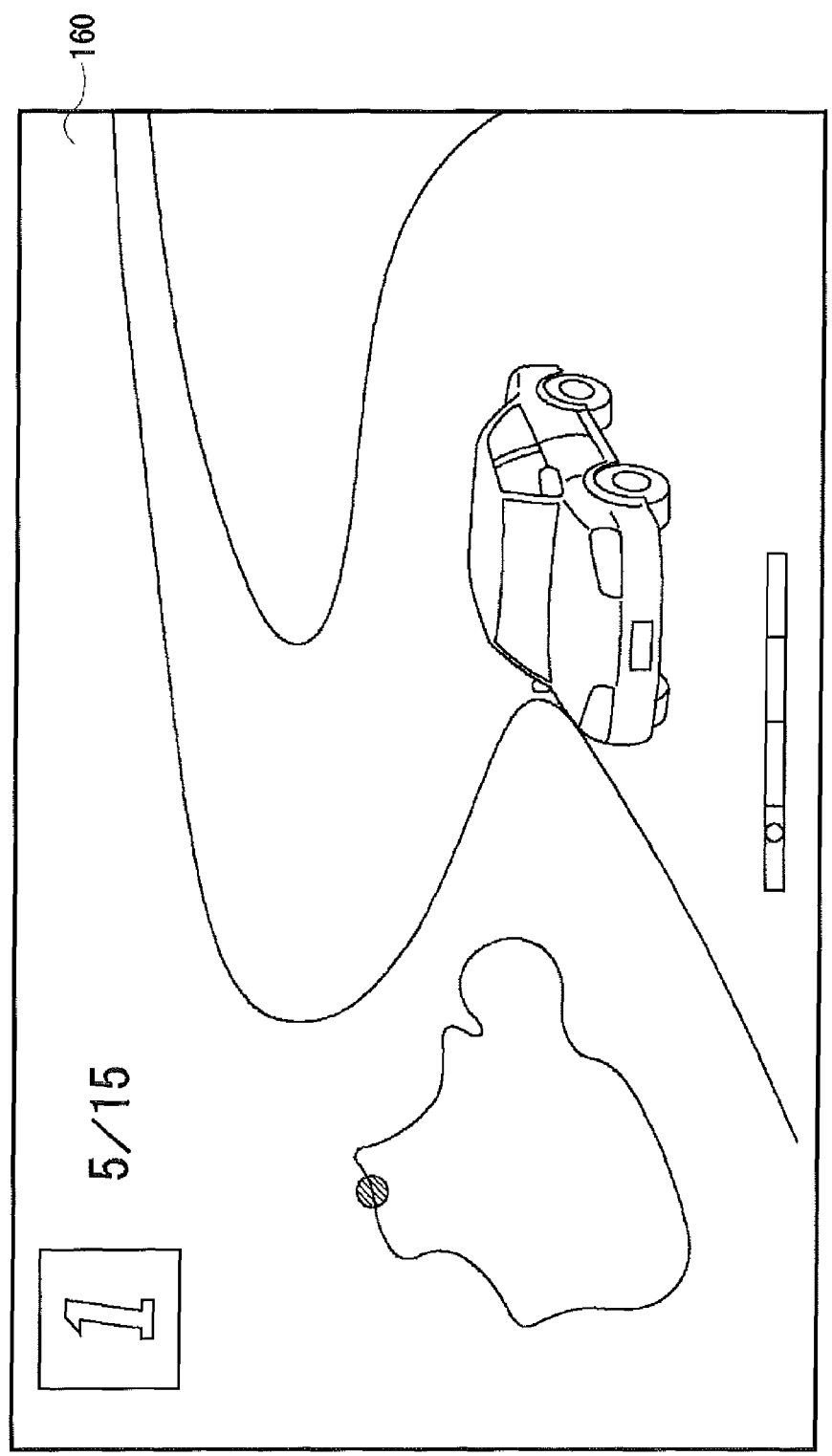
FIG. 6 is a diagram illustrating an example of the execution screen of a program displayed in the step S14 in FIG. 3.

FIG. 6 is a diagram illustrating an example of the execution screen of an application program displayed in the step S14 in FIG. 3. FIG. 6 illustrates a game execution screen 160 of a game program simulating car racing. As shown in FIG. 6, upon the execution of the application program, an execution screen is displayed on the television set 30 in accordance with the execution of the application program.

FIG. 3 is referred back. When a home button 44 is pressed by a user so as to request support from the system during the execution of the application program and then releases it within a predetermined period of time (hereinafter, referred to as pressing for a brief period) (S16), the instruction acquisition unit 94 acquires, from the user, a menu display instruction that requests a system menu screen to be displayed by a function of the operating system software.

When the home button 44 is pressed for more than a predetermined time (hereinafter, referred to as pressing for a long period), the menu-screen generating unit 108 generates a termination confirmation screen for the running application program (not shown). Buttons indicating "Yes" or "No," respectively, are displayed in the termination confirmation screen along with a message, "Exit the application program?"

When the button indicating "Yes" is selected by a user by use of the controller 42 and an instruction for terminating the running application program is then acquired by the instruction acquisition unit 94, the application-program execution unit 70 terminates the running application program. The menu-screen generating unit 108 generates the first system menu screen 120 at this time, just like when the power is turned on, and displays the first system menu screen 120 on the television set 30.

When the button indicating "No" is selected by the user by use of the controller 42 and an instruction for preventing the termination of the running application program is then acquired by the instruction acquisition unit 94, the application-program execution unit 70 keeps executing the application program. The display output unit 66 terminates the display of the first system menu screen 120 at this time and returns to the execution screen of the application program.

When a menu display instruction is acquired, the menu constituting unit 110 determines whether or not the game program is running by referring to the running application program (S18). When an application program other than the game program is running (N in S18), the menu constituting unit 110 configures the first system menu, which includes function icons and content icons. The menu-screen generating unit 108 generates the first system menu screen 120 on which a part of the function icons and content icons is displayed in such a manner that all the function icons and the content icons that configure the first system menu can be selected by a user through scrolling. The display output unit 66 displays the generated first system menu screen 120 on the television set 30 (S26). The application-program execution unit 70 keeps maintaining the execution of the application program at this time.

The display output unit 66 displays the second system menu screen 170 on the television set 30 at this time in such a manner that the second operating system menu screen 170 is displayed over the running application program when the home button 44 is pressed for a brief period. Pressing the home button 44 causes the instruction acquisition unit 94 to acquire, from the user, a menu display instruction that requests a system menu screen to be displayed by a function of the operating system software. In response to the pressing of the home button 44, the execution screen of the running application program is displayed on a background screen 121. This allows the user to recognize that the application program is running.

The application-program execution unit 70 may temporarily stop the application program, which is running when the home button 44 is pressed for a brief period, and may temporarily stop the execution screen of the application program. The display output unit 66 may display the second system menu screen 170 so that the second system menu screen 170 is displayed over the execution screen of the application program that is temporarily stopped in this manner.

In the embodiment, when displaying a system menu screen such as the first system menu screen 120, the system menu screen, in which those content icons that were arranged in the attention area 135 when the display of the system menu screen was last ended are reproduced to be arranged again in the attention area 135, is displayed. This allows the user to quickly find content icons that he/she wishes to select when the system menu screen is displayed.

When the first system menu screen 120 is displayed, the user can start another application program in parallel by selecting any of the content icons (S28). Such a process of starting an application program in parallel is hereinafter described.

The user can select to return to the execution screen of the application program by ending the display of the first system menu screen by pressing a predetermined button among the operation button 46 (S30). When a game program is running (Y in S18), the menu constituting unit 110 displays the second system menu screen 170 (S20). The application-program execution unit 70 continues to maintain the execution of the game program also at this time.

Figure 7:
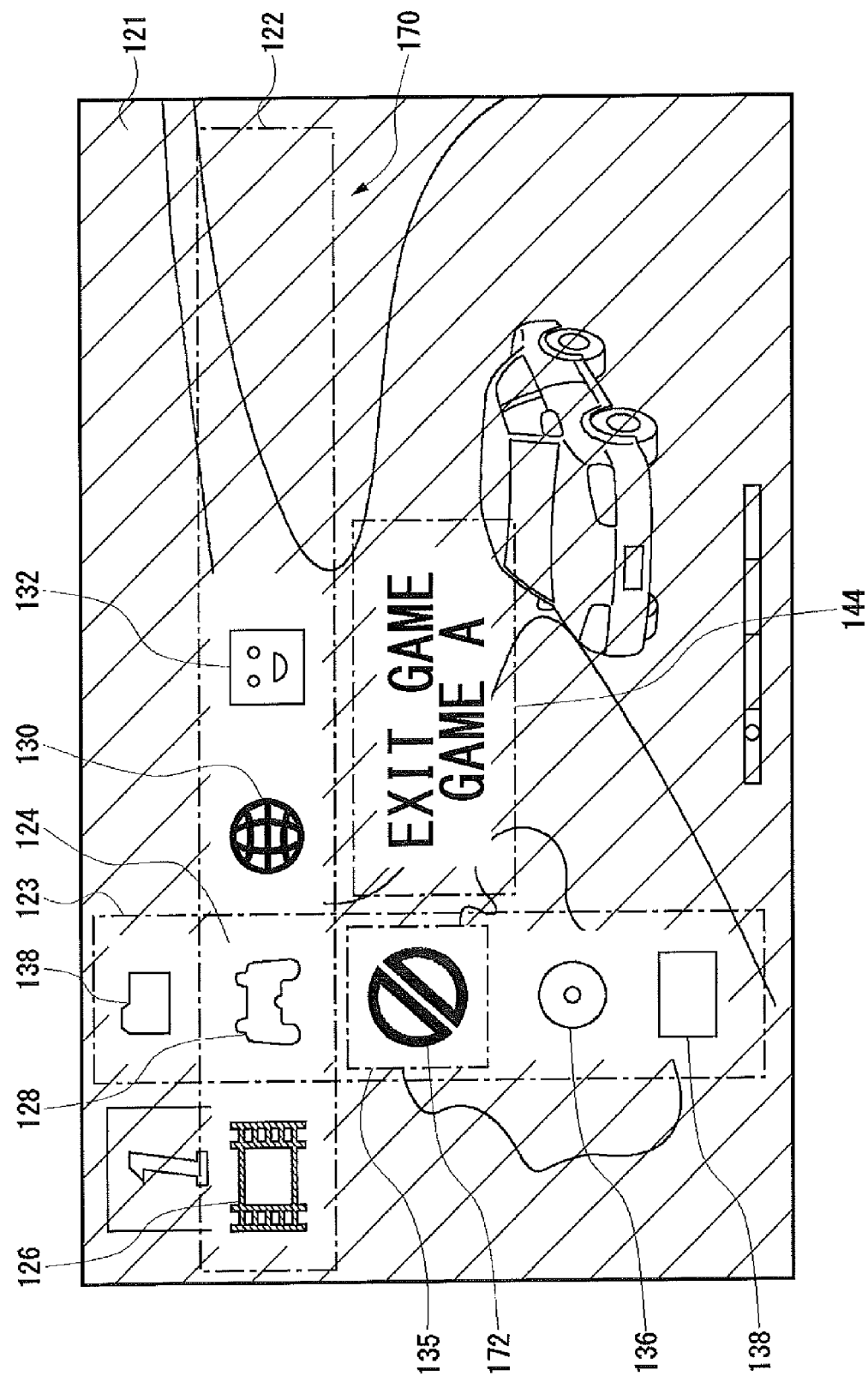
FIG. 7 is a diagram illustrating an example of the second system menu screen in step S20 in FIG. 3.

FIG. 7 is a diagram illustrating an example of the second system menu screen 170 in the step S20 in FIG. 3. The second system menu screen 170 is also used as a menu screen of the system and is also a menu screen that is displayed by a function of the system. The menu constituting unit 110 configures an end icon 172 for terminating the running game program and the second system menu that includes the content icons included in the first system menu. The menu constituting unit 110 arranges the end icon 172 in such a manner that the end icon 172 is inserted in the line of the content icons that are lined up in one line in the content icon array 123 at this time. The menu constituting unit 110 inserts the end icon 172 above the content icon that was located in the attention area 135 when the display of the system menu screen was previously ended.

The menu-screen generating unit 108 generates the second system menu screen 170 that includes a part of the configured second system menu in such a manner that each of the end icon 172 and a plurality of content icons that are included in the configured second system menu can be selected by scrolling. The second system menu screen may be generated that includes an instruction icon, instead of the end icon 172, for inputting an instruction to the running application program.

When displaying the end icon 172 in the attention area 135, the menu-screen generating unit 108 displays the message "exit game" in the description display area 144 so as to indicate to the user that the end icon 172 is for terminating the game application program. Also, by displaying "Game A" underneath the message, the menu-screen generating unit 108 indicates to the user that the application program to be terminated is the application program of Game A.

When displaying the second system menu screen 170 by pressing the home button 44 for a brief period for the first time after executing the game program, the menu-screen generating unit 108 displays the end icon 172 in an noticeable manner on the television set 30 by placing the end icon 172 in the attention area 135. This clearly indicates to the user, in the menu screen, that the running game program can be terminated.

Just like when the first system menu screen is displayed in the step S26 in FIG. 3, the display output unit 66 displays the second system menu screen 170 on the television set 30 in such a manner that the second system menu screen 170 is displayed over the running game program when the home button 44 is pressed for a brief period.

In the content icon array 123, a Game B icon 138, a Game A icon 136, a Game C icon 140, and a Game D icon 142 are lined up in order from the top. The menu constituting unit 110 configures the second system menu by inserting the end icon 172 above the Game A icon 136, for starting a game program A that is running, and below the Game B icon 138. Displaying while inserting the end icon 172 between the plurality of content icons that are lined up as described above allows for the selection of the end icon 172 with an operation feeling similar to that of when the selection of the content icon is made, allowing for a user interface with a sense of unity to be provided.

Furthermore, the menu-screen generating unit 108 generates the second system menu screen 170 in a simplified form in which the display load is reduced compared to the first system menu screen 120. The processing load of the game program during the execution is larger than that of the application program. Reducing the display load of the second system menu screen 170 in this manner allows for the suppression of any further increase of the processing load due to the display of the second system menu screen 170 during the execution of the game program.

More specifically, when displaying the first system menu screen 120, the menu-screen generating unit 108 highlights a game icon for which a thumbnail of the still image is displayed, for example, when the content icon of the game program is located in the attention area 135, and also generates the first system menu screen 120, which displays a thumbnail of a moving image indicating game program, in an area between the attention area 135 and the description display area 144 that is provided by further shifting the attention area 135 or the description display area 144 to the right. However, when displaying the second system menu screen 170, the menu-screen generating unit 108 highlights the game icon for which a thumbnail of the still image is displayed and generates the second system menu screen 170 in which the description display area 144 for reproducing the moving image is not provided. Preventing the reproduction of the moving image as described above allows for reduction of the display load. The respective thumbnails of the moving image and the still image that indicate the game program are stored in the memory unit 64 when the game program is stored.

When displaying the first system menu screen 120, the menu-screen generating unit 108 generates the first system menu screen 120 in which various icons for the corresponding application program are employed as content icons to be displayed in the content icon array 123. On the other hand, when displaying the second system menu screen 170, the menu-screen generating unit 108 selects content icons of images with a display load that is lower than that of the first system menu screen 120, from selections of less variety compared to those of the first system menu screen 120 and generates the second system menu screen 170. In addition, when displaying the first system menu screen 120, the menu-screen generating unit 108 may, for example, generate the first system menu screen 120, which displays a thumbnail that indicates content in a content icon displayed in the content icon array 123. When displaying the second system menu screen 170, the menu-screen generating unit 108 may generate the second system menu screen 170 that prevents the display of the thumbnail in the content icon displayed in the content icon array 123.

When the second system menu screen 170 is displayed, the user can not only select the content icon (S28) or select to return back to the condition where the game program is running (S30) but also select the end icon 172. When the end icon 172 is selected by the user (S22), the application-program execution unit 70 terminates the running game program, and the display output unit 66 terminates the display of the second system menu screen 170. Returning back to the step S10, the display output unit 66 then displays the first system menu screen 120 on the television set 30.

The menu constituting unit 110 configures the first system menu by deleting the end icon 172 from the second system menu. As shown in FIG. 5, the menu-screen generating unit 108 generates the first system menu screen 120 to be such as that which is obtained by deleting only the end icon 172 from the second system menu screen 170 displayed when the end icon 172 was selected and by moving up the content icons, which were located below the end icon 172 in the content icon array 123, by one.

Figure 4:
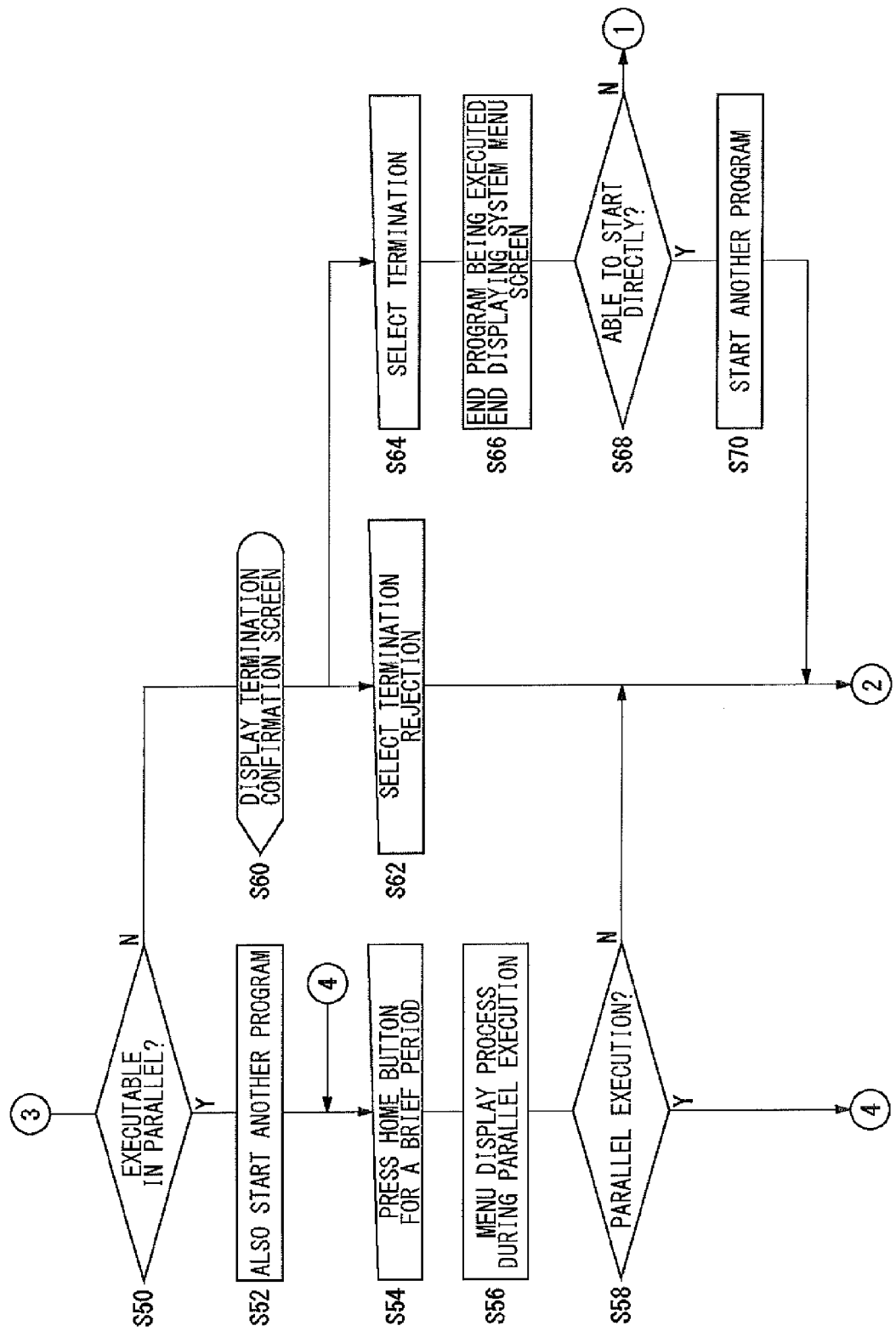
FIG. 4 is a flowchart illustrating a detailed sequence of a program parallel execution process, which is performed in step S28 in FIG. 3 when a content icon for starting another program is selected while a first system menu screen or a second system menu screen is displayed during the execution of a program.

FIG. 4 is a flowchart illustrating a detailed sequence of a program parallel execution process that is performed in the step S28 in FIG. 3, when a content icon for starting another application program is selected while the first system menu screen 120 or the second system menu screen 170 is displayed during the execution of an application program.

The application-program execution unit 70 determines whether or not the application program corresponding to the selected content icon can run in parallel with the running application program (S50). A map that shows a correspondence relationship of the application program that can run in parallel is stored in ROM or in the memory unit 64. Referring to the map, the application-program execution unit 70 determines whether or not the application program corresponding to the selected content icon can run in parallel with the running application program.

When the application program corresponding to the content icon selected in the first system menu screen 120 or the second system menu screen 170 cannot run in parallel with the running application program even when the home button 44 is pressed for a brief period during the execution of the application program (N in S50), the display control unit 68 generates a termination confirmation screen for a user to select whether or not to terminate the running application program (S60). This termination confirmation screen is the same as the one mentioned above.

When the button indicating "No" is selected and rejection of the termination of the running application program is selected (S62), the execution of the application program corresponding to the content icon selected in the first system menu screen 120 or the second system menu screen 170 is prevented, and the application program that has been on hold is resumed, returning back to the step S16 in FIG. 3. When the button indicating "Yes" is selected and the termination of the running application program is selected (S64), the application-program execution unit 70 terminates the running application program, and the display output unit 66 ends the display of the first system menu screen 120 or the second system menu screen 170 (S66).

The application-program execution unit 70 then determines whether or not the application program, which corresponds to the content icon selected in the first system menu screen 120 or in the second system menu screen 170, can be directly started. Information indicating application programs that cannot be started directly from the first system menu screen 120 or the second system menu screen 170 is stored in ROM or in the memory unit 64. Referring to the information, the application-program execution unit 70 determines whether or not the application program that corresponds to the selected content icon can be started directly from the first system menu screen 120 or the second system menu screen 170 (S68).

When the application program can be directly started (Y in S68), the application-program execution unit 70 starts an application program that corresponds to the selected content icon, the application program being different from the one that was executed (S70). When the application program cannot be directly started (N in S68), the flow moves to the step S10 in FIG. 3. The menu-screen generating unit 108 generates the first system menu screen 120 in which the icon corresponding to the application program is located in the attention area 135 and highlighted at this time.

In the embodiment, when the first system menu screen 120 is displayed while an application program other than a game program is running and when the content icon of the memory card 38, which is high-order content that includes low-order content, is selected by a user from the first system menu screen 120, the menu-screen generating unit 108 generates the first system menu screen 120 in which the low-order contents included in the memory card 38 are vertically arranged in a line near the right side of the content icon of the memory card 38. The menu-screen generating unit 108 displays the thumbnail of the low-order content in the content icon of the low-order content at this time.

On the other hand, when the second system menu screen 170 is displayed while the game program is running and when the content icon of the memory card 38 is selected by a user from the second system menu screen 170, the menu-screen generating unit 108 prevents the display of a content icon that indicates the low-order content included in the memory card 38 in the second system menu screen 170. More specifically, when the content icon of the memory card 38 is selected by the user while the second system menu screen 170 is being displayed, the menu-screen generating unit 108 first generates a termination confirmation screen for the user to confirm whether or not to terminate the running game program, and the display output unit 66 displays the termination confirmation screen, instead of the second system menu screen 170, on the television set 30. This termination confirmation screen is the same as the one mentioned above.

When an instruction for terminating the running game program from the user is acquired by the instruction acquisition unit 94, the menu-screen generating unit 108 generates the first system menu screen 120 in which content icons that indicate the low-order contents stored in the memory card 38 are vertically arranged in a line near the right side of the content icon array 123. The display output unit 66 displays the first system menu screen 120, instead of the termination confirmation screen, on the television set 30. The menu-screen generating unit 108 provides an attention area in a part of the area in which the content icons of the low-order content are arranged in a line. The menu-screen generating unit 108 arranges the content icon of one unit of low-order content in the attention area and highlights the content icon arranged in the attention area so that the content icon is temporarily selected.

Displaying, next to the content icon of the high-order content, the content icons of the low-order content included in the high-order content when the content icon of the high-order content is selected by the user in the second system menu screen 170 after displaying the termination confirmation screen as described above allows the user to feel as if the icons are displayed on the same system menu screen, providing a sense of unity to the user interface.

The processing load is large during the execution of the game program. Preventing the display of the content icon of the low-order content during the execution of the game program allows for the further increase of the processing load to be suppressed. The high-order content, including the low-order content, is not limited to the memory card 38 and may be, for example, a content icon of a CD (Compact Disc) representing other external storage or a content icon of a DVD (Digital Versatile Disc). The high-order content may be a folder icon that includes a music file or a moving image file as low-order content.

In the embodiment, even when the content icon of the high-order content that includes the low-order content is selected, if the high-order content is a music file or a moving image DVD, the reproduction of a selected music CD or moving image DVD is started without displaying the content icon of the low-order content as an application program that can be directly started (Y in S68).

When the parallel execution is possible (Y in S50), the application-program execution unit 70 further starts another application program that corresponds to the selected content icon in parallel with the running application program (S52). When the home button 44 is pressed for a brief period by a user so as to request support from the system while the two application programs are running in parallel (S54), the menu constituting unit 110 executes a menu display process during the parallel execution (S56). The application-program execution unit 70 determines whether or not the two application programs are continuously running as a result of the menu display process during the parallel execution and of the user entering input as to his/her selection via the controller 42 (S58). When they are running in parallel (Y in S58), the flow returns to the step S 54. When one of the two running application in parallel is terminated (N in S58), the flow moves to the step S16 in FIG. 3. A detailed description will be made hereinafter regarding the menu display process during the parallel execution in association with FIGS. 8-12.

Figure 8:
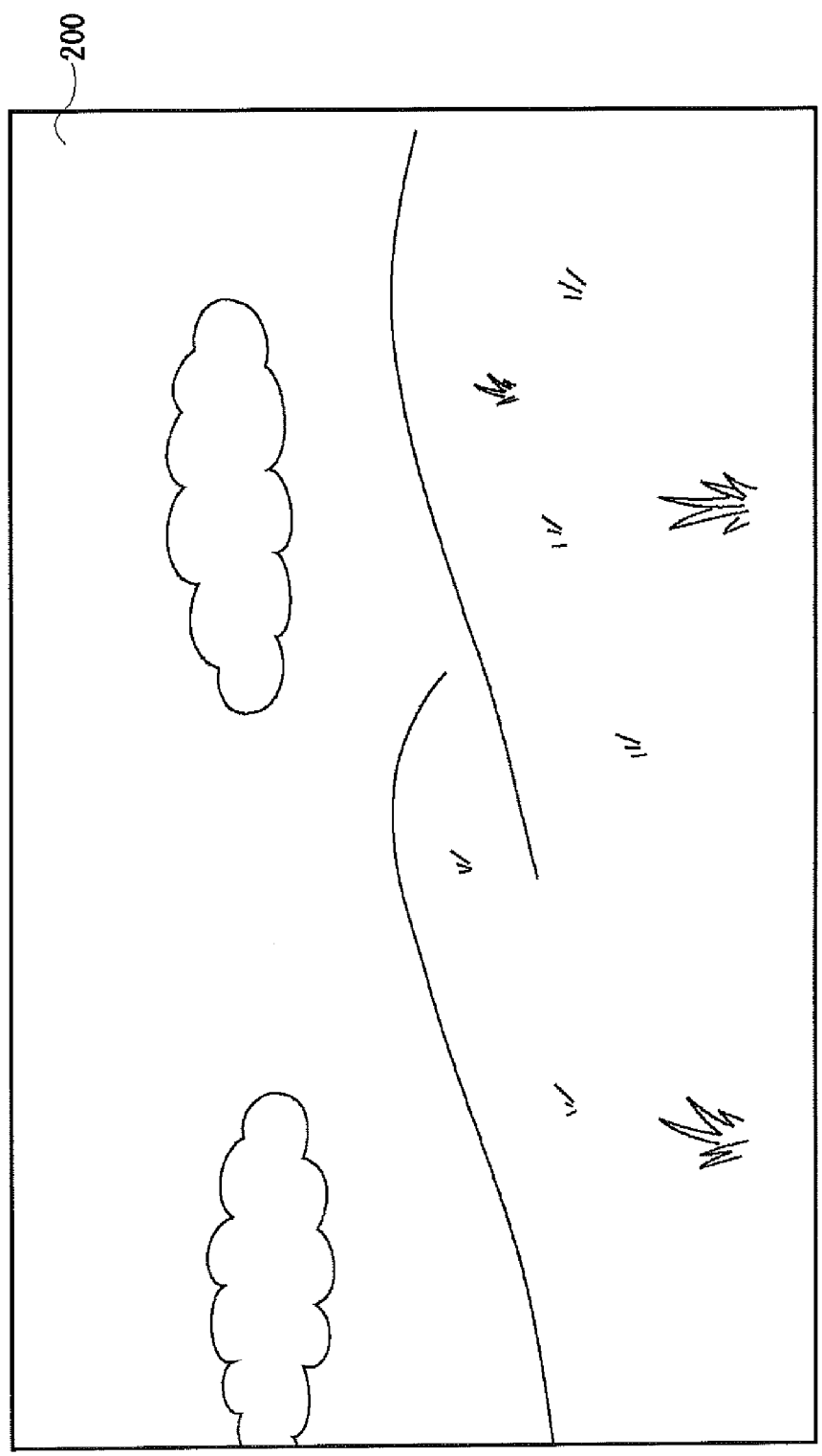
FIG. 8 is a diagram illustrating a condition where a slide show program and a music reproduction program are performed in parallel.

FIG. 8 is a diagram illustrating a condition where a slide show program and a music reproduction program are executed in parallel. When the slide show program is executed, still images stored in the memory unit 64 are displayed in order on the television set 30. The user can display the first system menu screen 120 by pressing the home button 44 for a brief period and start a music reproduction program by selecting a content icon of music stored in the memory unit 64. When the music reproduction program is started and the content of the music is reproduced, the display output unit 66 ends the display of the first system menu screen 120. Therefore, a still image is displayed on the television set 30 as shown in FIG. 8, and a sound is output from a speaker (not shown) by reproducing music data stored in the memory unit 64.

Figure 9:
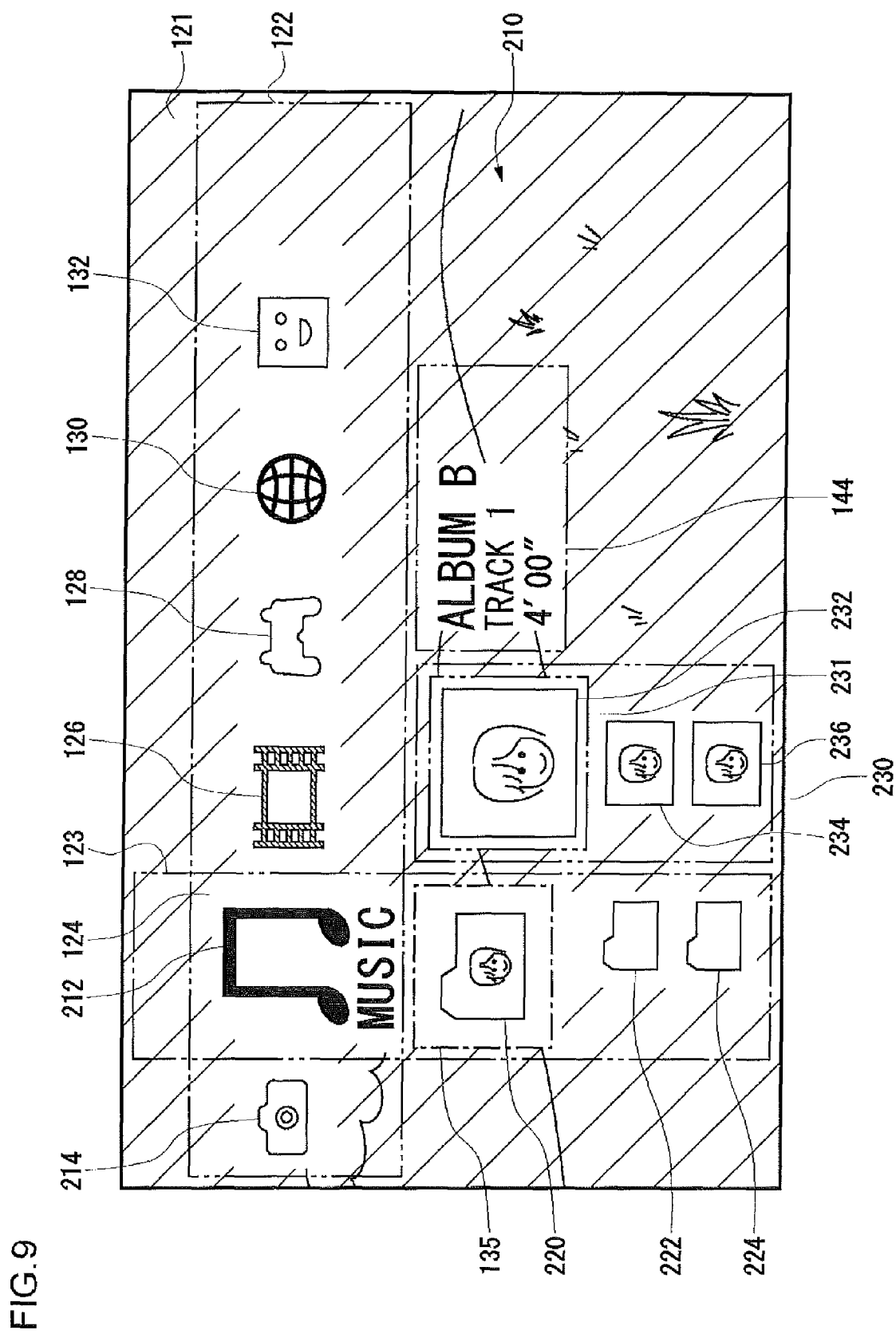
FIG. 9 is a diagram illustrating a condition where an A button is pressed for a brief period while a slide show program and a music reproduction program are performed in parallel.

FIG. 9 is a diagram illustrating a condition where the home button 44 is pressed for a brief period while a slide show program and a music reproduction program are performed in parallel. When the home button 44 is pressed for a brief period, the content icon located in the attention area 135, which was displayed when the home button 44 was pressed last time, is displayed again in the attention area 135. In the example shown in FIG. 9, since a folder icon 220 that indicates a folder stored in the content of music is previously displayed in the attention area 135, the folder icon 220 is also displayed in the attention area 135 in this case, and a folder icon 222 and a folder icon 224 are arranged under the folder icon 220.

Since the folder icon 220 stored in the content of music is displayed in the attention area 135, a music icon 212 is enlarged and highlighted in the intersection area 124. A photo icon 214 is arranged to the left of the music icon 212. The display output unit 66 displays a third system menu screen 210 in such a manner that the third system menu screen 210 is displayed over a still image stored in the memory unit 64 that is being displayed as the execution screen of the slide show program. The third system menu screen 210 is also used as a menu screen of the system and is also a menu screen that is displayed by a function of the system. This allows for a slide-show execution screen 200 to be displayed in the background screen 121 and allows the user to recognize that the slide show program is running.

The description display area 144 moves to the right at this time, and a content icon display area 230 is provided between the attention area 135 and the description display area 144. In the content icon display area 230, content icons are displayed while being aligned in a line in a vertical direction, which indicate the respective contents stored in a folder indicated by the folder icon 220 displayed in the attention area 135. The attention area 231 is provided in the high-order part of the content icon display area 230, and content icons that indicate other contents included in the folder are displayed. In the example shown in FIG. 9, the content icon 232 is displayed in the attention area 231, and the content icon 234 and the content icon 236 are displayed under the content icon 232.

The album name of music content that is being reproduced, in other words, the name of the folder indicated by the folder icon 220 is displayed in the description display area 144, and the song title of the music content that is being reproduced is displayed under the folder name. Further, the total playing time of the song is displayed under the song title.

In the embodiment, when the home button 44 is pressed for a brief period while the music reproduction program is running in parallel with another application program, the third system menu is configured in which an icon for display during reproduction is added, which indicates that the music is being reproduced by the music reproduction program. The menu-screen generating unit 108 generates the third system menu screen 210, which includes a part of the configured third system menu in such a manner that each of the icon for display during reproduction and a plurality of content icons that are included in the configured third system menu can be selectable by scrolling. When a predetermined button among the operation buttons 46 is pressed while only the music reproduction program is running, the menu-screen generating unit 108 displays an operation panel using the entire screen.

The menu constituting unit 110 configures the third system menu in which an icon 240 for display during reproduction is inserted in a plurality of content icons that are lined up in one line in the content icon array 123 of the music icon 212. The menu constituting unit 110 may insert the icon for display during reproduction 240 above the content icon that was located in the attention area 135 when the display of the system menu screen was last ended. Displaying while inserting the icon for display during reproduction 240 between the plurality of content icons that are lined up as described above allows for the selection of the icon for display during reproduction 240 with an operation feeling similar to that of when the selection of the content icon is made, allowing for a user interface with a sense of unity to be provided.

Figure 10:
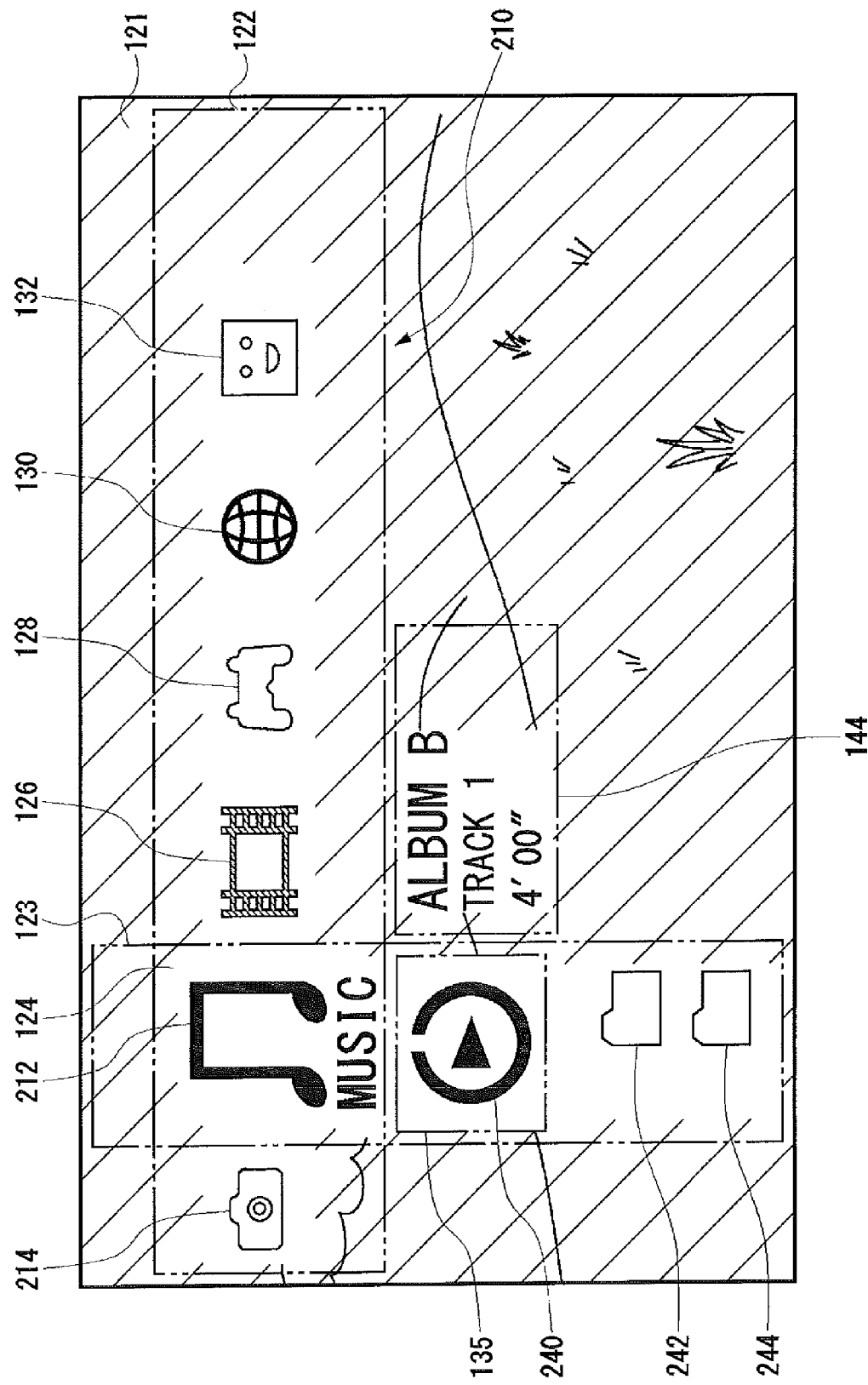
FIG. 10 is a diagram illustrating a third system menu screen when an icon for display during reproduction is displayed in an attention area.

FIG. 10 is a diagram illustrating a third system menu screen 210 when the icon 240 for display during reproduction is displayed in the attention area 135. The content icon displayed in the attention area 231 is highlighted in FIG. 9. The icon 240 for display during reproduction can be displayed in the attention area 135 as shown in FIG. 10 by, for example, operating the directional button 48 so as to move an icon to be highlighted to the attention area 135 and by further scrolling of a vertical direction. In the example shown in FIG. 10, a folder icon 242 and a folder icon 244 are displayed under the icon 240 for display during reproduction.

Moving the icon highlighted in the attention area 135 deletes the content icon display area 230, allowing for the description display area 144 to be displayed again in the area where the content icon display area 230 used to be. The status of the music reproduction is continuously displayed in the description display area 144. As described above, displaying the icon 240 for display during reproduction allows for the operation of a content being reproduced and provides a unified interface.

Figure 11:
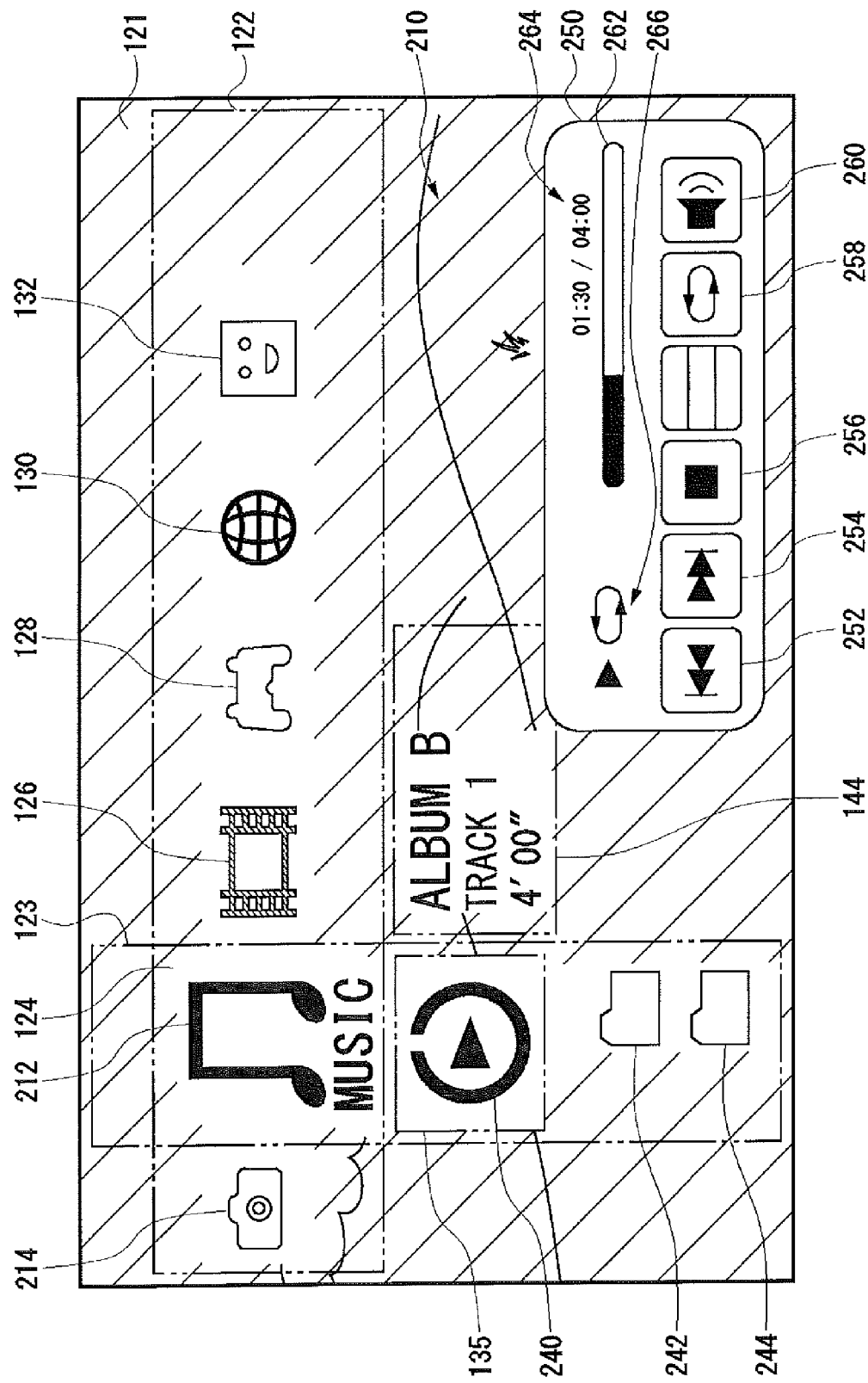
FIG. 11 is a diagram illustrating a condition when an icon for display during reproduction is selected during the condition shown in FIG. 10.

FIG. 11 is a diagram illustrating a condition when the icon 240 for display during reproduction is selected in the condition shown in FIG. 10. When the icon 240 for display during reproduction is selected, the menu-screen generating unit 108 generates a third system menu screen 210 in which an operation panel 250 is displayed in the bottom-right area. The operation panel 250 displays a previous song icon 252, a next song icon 254, a stop icon 256, a repeat icon 258, a sound volume icon 260, a playing-time display bar 262, a playing-time display area 264, and a reproduction-status display area 266. A user can enter an instruction to the reproduction state of a music content by operating, for example, the directional button 48 and the operation buttons 46 so as to select the previous song icon 252, the next song icon 254, the stop icon 256, the repeat icon 258, and the sound volume icon 260.

For example, the user can select a previous song by selecting the previous song icon 252 and select a next song by selecting the next song icon 254. The user can also stop the reproduction of the music content that is being reproduced by selecting the stop icon 256. The user can also select to repeatedly reproduce the music content or clear the selection of the repeat reproduction thereof by selecting the repeat icon 258. The user can adjust the volume of a sound that is output from a speaker by selecting the sound volume icon 260.

Figure 12:
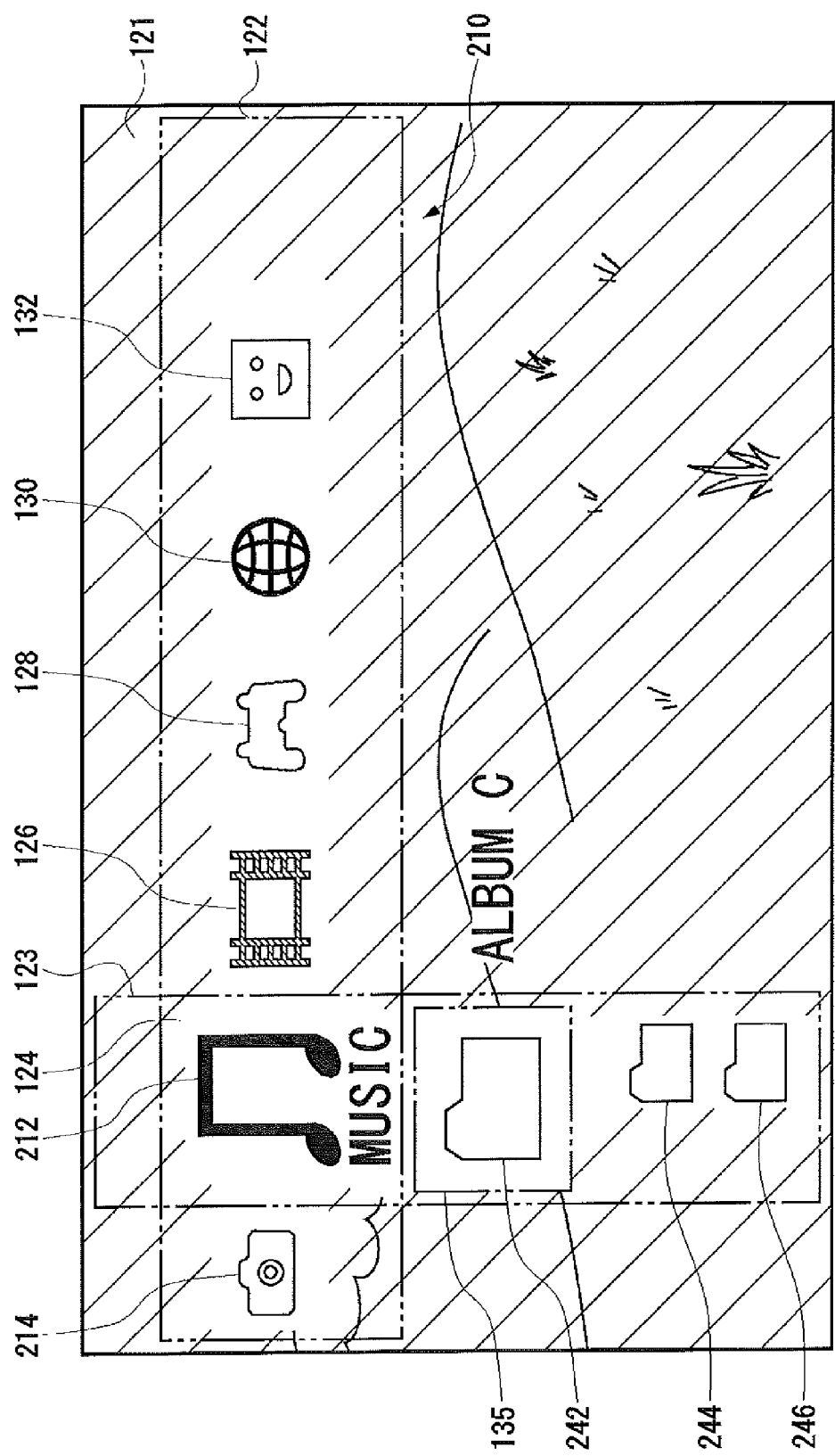
FIG. 12 is a diagram illustrating a condition immediately after a stop icon, which is located on an operation panel, is selected by a user.

FIG. 12 is a diagram illustrating a condition immediately after the stop icon 256 on the operation panel 250 is selected by the user. When the stop icon 256 of the operation panel 250 is selected by the user, the instruction acquisition unit 94 acquires an instruction input for stopping the reproduction of the music content that is being reproduced. When acquiring the instruction input, the application-program execution unit 70 stops the music reproduction program and stops the reproduction of the music content. The menu constituting unit 110 configures the first system menu by deleting the icon 240 for display during reproduction from the third system menu. The menu-screen generating unit 108 generates the first system menu screen 120, which includes a part of the configured first system menu.

The menu constituting unit 110 configures the first system menu by deleting, from the third system, the icon 240 for display during reproduction menu at this time. As shown in FIG. 12, the menu-screen generating unit 108 generates the first system menu screen 120 such as one that is obtained by deleting, from the third system menu screen 210 displayed when the icon 240 for display during reproduction was selected during reproduction, only the icon 240 for display during reproduction and by moving up by one the content icons, which were located below the icon 240 for display during reproduction in the content icon array 123. In other words, the folder icon 242 that was arranged under the icon 240 for display during reproduction is arranged in the attention area 135 so that the folder icon 244 is moved up by one. The folder icon 246 that was hidden under the folder icon 244 is displayed under the folder icon 244.

Described above is an explanation based on the exemplary embodiments of the present invention. The embodiment is intended to be illustrative only, and it will be obvious to those skilled in the art that various modifications to constituting elements and processes could be developed and that such modifications are also within the scope of the present invention. A detailed description is now given of modifications.

In the exemplary embodiment, a menu screen is configured so that the intersection area 124 is located immediately above the attention area 135. As a modification thereof, the menu screen may be configured so that, for example, the intersection area 124 is located immediately below or in the periphery of the attention area 135, as long as it provides an arrangement with which a user can easily check a function icon while paying attention to an attention icon.

A multimedia player 20 of the exemplary embodiment is configured so that the intersection area 124 and the attention area 135 are located near the centers of the first system menu screen 120, the second system menu screen 170, and the third system menu screen 210. In a modification, the positions where the intersection area 124 and the attention area 135 are displayed may be freely determined by a user.

The multimedia player 20 of the exemplary embodiment displays a menu screen for providing instructions as to content reproduction, on the externally connected television set 30. As a modification thereof, the multimedia player may be a portable multifunctional device, which comprises a display integrated with the player. Also, the multimedia player may be implemented by a personal computer executing computer programs for providing various functions described in the exemplary embodiment.

The present invention allows for a user to be provided with a unified user interface in terms of a menu screen.

EXPLANATION OF REFERENCE NUMERALS 1 multimedia reproduction system
2 multimedia player
30 television set
42 controller
44 home button
64 memory unit
66 display output unit
68 display control unit
70 application-program execution unit
94 instruction acquisition unit
108 menu-screen generating unit
110 menu constituting unit

The invention claimed is:

1. A menu screen display method, comprising:
  acquiring a first menu display instruction from a user requesting that an operating system program generate a first operating system menu screen to be displayed on a display screen of a computer processing device, wherein the first menu display instruction is produced by the user pressing a button of the computer processing device or a peripheral device connected thereto without interaction with any icon of the display screen;
  displaying the first operating system menu screen on the display screen of the computer processing device in response to the first menu display instruction, where the first operating system menu screen is generated by the operating system program on the computer processing device, and where the first operating system menu screen includes a content icon that is selectable by a user to cause the computer processing device to run the application program;

acquiring a second menu display instruction from the user requesting that the operating system program generate a second operating system menu screen to be displayed on the display screen while the application program is running, wherein the second menu display instruction is produced by the user pressing the button of the computer processing device or the peripheral device connected thereto without interaction with the content icon of the display screen;

generating, by the operating system program, the second operating system menu screen in response to the second menu display instruction while the application program is running, wherein the second operating system menu screen includes the content icon and an instruction icon for receiving a user-selected instruction to the running application program; and displaying the second operating system menu screen on the display screen such that the content icon and instruction icon are spaced apart from one another on the display screen.

2. The menu screen display method according to claim 1, wherein displaying the second operating system menu screen includes that the instruction icon is located adjacent to the content icon among a plurality of content icons such that all are displayed in a linear array.

3. The menu screen display method according to claim 2, wherein displaying the second operating system menu screen includes that the linear array is vertically oriented with respect to the user's point of view and the array may be scrolled via user input in order to select the instruction icon.

4. The menu screen display method according to claim 1, wherein the operating system program causes the second operating system menu screen to be superimposed over an application program image generated by the running application program in response to the menu display instruction being acquired by the operating system program.

5. The menu screen display method according to claim 1, wherein the instruction icon and the content icon are graphically mixed such that visual elements of both the content icon and instruction icon are visible within a frame of a single icon.

6. The menu screen display method according to claim 1, wherein the instruction icon is an end icon for terminating the application program, and the method further comprising:
acquiring a selection of the end icon displayed on the second operating system menu screen from the user; and
terminating, when the selection of the end icon is acquired, the running application program and displaying the first operating system menu screen by deleting the end icon from the second operating system menu screen.

7. The menu screen display method according to claim 1, further comprising:
acquiring a selection of a further content icon displayed on the second operating system menu screen from the user; and
running a further application program, which corresponds to the selected further content icon in addition to running the application program.

8. The menu screen display device according to claim 7, further comprising:
acquiring an input-screen display instruction from the user requesting that the operating system program generate an instruction-input screen for entering an instruction to the further application program while the further application program is running and while the application program is running;
generating, by the operating system program, the instruction-input screen in response to the input-screen display instruction while the further application program is running and while the application program is running; and
displaying the instruction-input screen for entering the instruction to the further application program without displaying the second operating system menu screen.

9. A menu screen display device, comprising:
a microprocessor executing an operating system program;
an acquisition unit working in conjunction with said microprocessor and configured to acquire a first menu display instruction from a user requesting that an operating system program generate a first operating system menu screen to be displayed on a display screen of a computer processing device, wherein the first menu display instruction is produced by the user pressing a button of the computer processing device or a peripheral device connected thereto without interaction with any icon of the display screen;
a display screen operating to display the first operating system menu screen, where the first operating system menu screen is generated by the operating system in response to the first menu display instruction on the microprocessor, and where the first operating system menu screen includes a content icon that is selectable by a user to cause the microprocessor to run the application program;
the acquisition unit working in conjunction with said microprocessor and configured to acquire a second menu display instruction from the user requesting that the operating system program generate a second operating system menu screen to be displayed on the display screen while the application program is running, wherein the second menu display instruction is produced by the user pressing the button of the computer processing device or the peripheral device connected thereto without interaction with the content icon of the display screen; and
a menu-screen generating unit working in conjunction with said microprocessor and configured to: (i) generate, by the operating system program, the second operating system menu screen in response to the second menu display instruction while the application program is running, wherein the second operating system menu screen includes the content icon and an instruction icon for receiving a user-selected instruction to the running application program, and (ii) cause the display screen to display the second operating system menu screen on the display screen such that the content icon and instruction icon are spaced apart from one another on the display screen.

10. A menu screen display method, comprising:
acquiring a first menu display instruction from a user requesting that an operating system program generate a first operating system menu screen to be displayed on a display screen of a computer processing device, wherein the first menu display instruction is produced by the user pressing a button of the computer processing device or a peripheral device connected thereto without interaction with any icon of the display screen;
displaying the first operating system menu screen on the display screen of the computer processing device in response to the first menu display instruction, where the first operating system menu screen is generated by an operating system program on the computer processing device, and where the first operating system menu screen includes a content icon that is selectable by a user to cause the computer processing device to run the application program;

acquiring a second menu display instruction from the user requesting that the operating system program generate a second operating system menu screen to be displayed on the display screen while the application program is running, wherein the second menu display instruction is produced by the user pressing the button of the computer processing device or the peripheral device connected thereto without interaction with the content icon of the display screen;

generating, by the operating system program, the second operating system menu screen in response to the second menu display instruction while the application program is running, wherein the second operating system menu screen includes a further content icon that is selectable by the user to cause the computer processing device to run a further application program and displaying the second operating system menu screen on the display screen;

acquiring a selection of the further content icon displayed on the second operating system menu screen from the user;

running the further application program, which corresponds to the selected further content icon in addition to running the application program;

acquiring an operation-panel display instruction from the user requesting that the operating system program generate an operation-panel input screen for entering an instruction to the further application program while the further application program is running and while the application program is running;

generating, by the operating system program, the operation-panel input screen in response to the operation-panel display instruction while the further application program is running and while the application program is running; and displaying the operation-panel input screen for entering the instruction to the further application program without displaying the second operating system menu screen.

11. The menu screen display method according to claim 10, wherein:
the application program is a reproduction application program for reproducing content including at least one of still image content and moving image content; and
the further application program is a reproduction application program for reproducing music content.

12. The menu screen display method according to claim 11, further comprising:
acquiring the operation-panel display instruction via selection of an operation-panel display icon by the user;
displaying the operation-panel input screen when the selection of the operation-panel display icon is acquired;
acquiring instruction input from the user to the operation-panel input screen regarding a reproduction state of music content;
terminating the further application program, when the instruction input includes an instructions for stopping the further application program; and
displaying the first operating system menu screen by deleting the operation-panel input screen from the display.

13. A menu screen display device, comprising:
a microprocessor executing an operating system program;
an acquisition unit working in conjunction with said microprocessor and configured to acquire a first menu display instruction from a user requesting that an operating system program generate a first operating system menu screen to be displayed on a display screen of a computer processing device, wherein the first menu display instruction is produced by the user pressing a button of the computer processing device or a peripheral device connected thereto without interaction with any icon of the display screen;
a display screen operating to display the first operating system menu screen, where the first operating system menu screen is generated by the operating system in response to the first menu display instruction on the microprocessor, and where the first operating system menu screen includes a content icon that is selectable by a user to cause the microprocessor to run the application program;
the instruction acquisition unit configured to acquire a second menu display instruction from the user requesting that the operating system program generate a second operating system menu screen to be displayed on the display screen while the application program is running, wherein the second menu display instruction is produced by the user pressing the button of the computer processing device or the peripheral device connected thereto without interaction with the content icon of the display screen;
a menu-screen generating unit configured to: (i) generate, by the operating system program, the second operating system menu screen in response to the second menu display instruction while the application program is running, wherein the second operating system menu screen includes a further content icon that is selectable by the user to cause the computer processing device to run a further application program and, (ii) display the second operating system menu screen on the display screen, wherein:
the instruction acquisition unit acquires a selection of the further content icon displayed on the second operating system menu screen from the user;
the microprocessor runs the further application program, which corresponds to the selected further content icon in addition to running the application program;
the instruction acquisition unit acquires an operation-panel display instruction from the user requesting that the operating system program generate an operation-panel input screen for entering an instruction to the further application program while the further application program is running and while the application program is running;
the microprocessor generates, by the operating system program, the operation-panel input screen in response to the operation-panel display instruction while the further application program is running and while the application program is running; and
the display screen displays the operation-panel input screen for entering the instruction to the further application program without displaying the second operating system menu screen.

14. The menu screen display method according to claim 1, wherein the first operating system menu screen is generated by the operating system program in response to a condition in which a given application program is not running on the computer processing device.

15. The menu screen display device according to claim 13, wherein:
- the application program is a reproduction application program for reproducing content including at least one of still image content and moving image content; and
- the further application program is a reproduction application program for reproducing music content.

16. The menu screen display device according to claim 15, wherein:
- the instruction acquisition unit acquires the operation-panel display instruction via selection of an operation-panel display icon by the user;
- the display screen displays the operation-panel input screen when the selection of the operation-panel display icon is acquired;
- the instruction acquisition unit acquires instruction input from the user to the operation-panel input screen regarding a reproduction state of music content;
- the microprocessor terminates the further application program, when the instruction input includes an instructions for stopping the further application program; and
- the menu-screen generating unit causes the display screen to display the first operating system menu screen by deleting the operation-panel input screen from the display.

* * * * *